United States Patent
Didiot et al.

(10) Patent No.: US 10,442,090 B2
(45) Date of Patent: Oct. 15, 2019

(54) DEVICE FOR GRIPPING AT LEAST ONE DEFORMABLE PRODUCT

(71) Applicant: FROMAGERIES BEL, Paris (FR)

(72) Inventors: Leonard Didiot, Gesnes-en-Argonne (FR); Juan Godoy Ricalde, Mayenne (FR); Julien Leclercq, Champs-sur-Marne (FR)

(73) Assignee: FROMAGERIES BEL, Suresnes (FR)

( * ) Notice: Subject to any disclaimer, the term of this patent is extended or adjusted under 35 U.S.C. 154(b) by 485 days.

(21) Appl. No.: 14/422,506

(22) PCT Filed: Oct. 22, 2013

(86) PCT No.: PCT/EP2013/072047
§ 371 (c)(1),
(2) Date: Feb. 19, 2015

(87) PCT Pub. No.: WO2014/064090
PCT Pub. Date: May 1, 2014

(65) Prior Publication Data
US 2015/0239131 A1    Aug. 27, 2015

(30) Foreign Application Priority Data

Oct. 23, 2012 (FR) .................................... 12 60084

(51) Int. Cl.
*B25J 15/06* (2006.01)
*B25J 11/00* (2006.01)
*A23P 20/20* (2016.01)

(52) U.S. Cl.
CPC ........... *B25J 15/0616* (2013.01); *A23P 20/20* (2016.08); *B25J 11/0045* (2013.01);
(Continued)

(58) Field of Classification Search
CPC .... B25J 15/0616; B25J 15/06; B25J 15/0625; B25J 15/0666; B25J 15/0683; B25J 15/065; B25J 11/00; B25J 11/0045; A23P 20/20
(Continued)

(56) References Cited

U.S. PATENT DOCUMENTS 2,893,581 A * 7/1959 Cushman ................ B66F 9/181
294/189
2,942,745 A * 6/1960 Horton .................... B66F 9/181
294/186
(Continued)

FOREIGN PATENT DOCUMENTS

| DE | 10 2010 034 720 A1 | 2/2012 |
| EP | 1 997 594 A1 | 12/2008 |
| FR | 2 912 603 A1 | 8/2008 |

OTHER PUBLICATIONS

International Search Report, dated Dec. 4, 2013, from corresponding PCT application.

*Primary Examiner* — Gloria R Weeks
(74) *Attorney, Agent, or Firm* — Young & Thompson (57) ABSTRACT

A gripping device for gripping at least one deformable food product, includes:
a chamber,
a depressurization system for depressurizing the chamber,
a fluid connection connecting the depressurization system to the chamber, and
at least one perforated plate (246) defining a receiving surface (248) for receiving the deformable food product, the perforated plate (246) having at least one perforation opening into the receiving surface (248) and into the chamber.

14 Claims, 8 Drawing Sheets

(52) U.S. Cl.
CPC ....... *B25J 15/0625* (2013.01); *B25J 15/0666* (2013.01); *B25J 15/0683* (2013.01)

(58) Field of Classification Search
USPC .......... 53/116, 514, 517, 518; 294/183, 186, 294/188; 414/627; 426/129, 130, 138, 426/140, 392, 410, 414, 415; 99/450.1, 99/450.6
See application file for complete search history.

(56) References Cited

U.S. PATENT DOCUMENTS

| | | | | |
|---|---|---|---|---|
| 3,117,815 A * | 1/1964 | Creskoff | ............... | B66C 1/0231 294/189 |
| 3,118,554 A * | 1/1964 | Brainard | ................ | B66F 9/181 294/65 |
| 3,227,481 A * | 1/1966 | Creskoff | ............... | B66C 1/0281 294/189 |
| 3,387,718 A * | 6/1968 | Roth | ...................... | B65G 57/04 294/119.3 |
| 3,941,037 A * | 3/1976 | Reichert | ................ | B65B 5/024 493/167 |
| 3,976,205 A * | 8/1976 | Goransson | ........... | B66C 1/0262 294/188 |
| 3,982,782 A * | 9/1976 | Bos | ......................... | B66F 9/181 294/189 |
| 4,081,192 A * | 3/1978 | Jones | ..................... | A01D 9/06 294/61 |
| 4,355,936 A * | 10/1982 | Thomas | ................. | B65B 23/08 294/2 |
| 4,386,490 A * | 6/1983 | Griffith | ................... | B65B 19/34 53/148 |
| 4,418,511 A * | 12/1983 | Collin | .................... | B65B 11/52 264/553 |
| 4,575,991 A * | 3/1986 | Hollingsworth | ........ | B65B 11/52 53/141 |
| 4,782,644 A * | 11/1988 | Haarer | .................... | A24C 5/00 53/253 |
| 4,828,304 A * | 5/1989 | No | ........................ | B25J 15/0616 294/106 |
| 5,024,575 A * | 6/1991 | Anderson | .............. | B65G 47/90 294/2 |
| 5,088,878 A * | 2/1992 | Focke | .................... | B65G 47/91 294/188 |
| 5,113,635 A * | 5/1992 | Takai | ...................... | B65B 9/207 452/31 |
| 5,454,214 A * | 10/1995 | Lancaster | ............... | B65B 11/52 53/509 |
| 5,660,024 A * | 8/1997 | Ivanov | ................... | B65B 63/04 53/116 |
| 5,727,832 A * | 3/1998 | Holter | ................. | B25J 15/0616 294/185 |
| 5,752,729 A * | 5/1998 | Crozier | ................. | B66C 1/0218 294/188 |
| 5,813,713 A * | 9/1998 | Van Den Bergh | ..... | B65G 47/91 294/2 |
| 6,641,131 B2 * | 11/2003 | Stohr | ................... | B65H 3/0883 271/107 |
| 6,860,531 B2 * | 3/2005 | Sherwin | ............... | B25J 15/0052 294/103.1 |
| 6,920,739 B2 * | 7/2005 | Finkowski | ............. | A21C 11/02 53/244 |
| 7,000,964 B1 * | 2/2006 | Porras | .................. | B65G 47/917 294/186 |
| 7,017,961 B1 * | 3/2006 | Parnell | ................... | B65G 47/91 294/188 |
| 7,631,912 B2 * | 12/2009 | Hupp | .................... | B66C 1/0212 277/650 |
| 7,637,711 B2 * | 12/2009 | Wronski | ................ | B65H 31/06 414/793 |
| 7,665,949 B2 * | 2/2010 | Pearce | .................... | B66F 9/085 294/65 |
| 7,938,466 B2 * | 5/2011 | Joguet | .................. | B25J 15/0616 294/189 |
| 7,950,708 B2 * | 5/2011 | Parnell | .................. | B25J 15/0052 294/2 |
| 8,163,251 B2 * | 4/2012 | Py | ............................. | A61L 2/04 414/147 |
| 8,251,415 B2 * | 8/2012 | Lomerson, Jr. | ...... | B25J 15/0616 294/2 |
| 8,267,386 B2 * | 9/2012 | Schaaf | .................... | B65G 47/91 269/20 |
| 8,528,955 B2 * | 9/2013 | Robinson | ............. | B25J 11/0045 294/185 |
| 8,534,730 B2 * | 9/2013 | Strohmayr | ............ | B66C 1/0218 294/185 |
| 8,616,602 B2 * | 12/2013 | Hukelmann | ......... | B65G 47/911 294/183 |
| 8,960,749 B2 * | 2/2015 | Fukano | .................. | B65G 47/91 294/188 |
| 9,061,868 B1 * | 6/2015 | Paulsen | ................ | B66C 1/0218 |
| 9,156,570 B2 * | 10/2015 | Lomerson, Jr. | ...... | B25J 15/0052 |
| 9,205,558 B1 * | 12/2015 | Zevenbergen | ......... | B25J 9/1664 |
| 9,238,305 B2 * | 1/2016 | Regan | .................. | B25J 15/0675 |
| 9,375,908 B2 * | 6/2016 | Metschan | .............. | B32B 38/1858 |
| 9,469,490 B2 * | 10/2016 | Yohe | ..................... | B65G 47/912 |
| 9,567,157 B2 * | 2/2017 | Scudder | ................. | B65D 88/54 |
| 9,592,970 B2 * | 3/2017 | Henderson | ............ | B65G 57/24 |
| 9,604,366 B2 * | 3/2017 | Li | ........................ | B25J 15/0061 |
| 9,669,554 B2 * | 6/2017 | Eisele | .................. | B25B 11/005 |
| 2003/0164620 A1 * | 9/2003 | Schmalz | ............... | B25J 15/0616 294/188 |
| 2006/0107846 A1 * | 5/2006 | Foulon, Jr. | .............. | A23P 20/20 99/450.1 |
| 2007/0059149 A1 * | 3/2007 | Rich | .................... | B65G 47/914 414/752.1 |
| 2008/0080962 A1 * | 4/2008 | Holtmeier | ............ | B25J 15/0052 414/627 |
| 2008/0296820 A1 * | 12/2008 | Bambi | ................. | B25J 15/0616 269/21 |
| 2008/0299245 A1 * | 12/2008 | Bambi | ................. | B25J 15/0616 425/437 |
| 2009/0320417 A1 * | 12/2009 | Gilmore | ................ | B25J 15/0052 53/473 |
| 2010/0040450 A1 * | 2/2010 | Parnell | ................ | B25J 15/0052 414/752.1 |
| 2010/0287893 A1 * | 11/2010 | Ehrmann | ................ | B65B 7/01 53/487 |
| 2011/0293397 A1 * | 12/2011 | Lomerson, Jr. | ...... | B25J 15/0052 414/800 |
| 2012/0186381 A1 | 7/2012 | Robinson et al. | | |
| 2012/0319416 A1 * | 12/2012 | Ellis | ..................... | B25J 15/0616 294/183 |
| 2013/0026775 A1 * | 1/2013 | Sydorko | ................ | B25B 11/007 294/183 |
| 2013/0127193 A1 * | 5/2013 | Regan | .................. | B25J 15/0675 294/183 |
| 2014/0225391 A1 * | 8/2014 | Kuolt | ................... | B25J 15/0616 294/183 |
| 2015/0216225 A1 * | 8/2015 | Da Ponte | ................ | A23P 1/086 426/514 |
| 2016/0067867 A1 * | 3/2016 | Harter | .................... | B65G 47/91 294/188 |
| 2017/0265392 A1 * | 9/2017 | Van De Vegte | ..... | A01D 45/005 |

* cited by examiner

DEVICE FOR GRIPPING AT LEAST ONE DEFORMABLE PRODUCT

The present invention relates to a gripping device for gripping at least one deformable food product.

Methods for producing filled food products are already known, for example from the patent FR 2912603. The filled food manufactured by means of the method disclosed in this document are surimi sticks filled with cheese, typically packaged in plastic trays or similar material. These sticks each have a thick exterior layer of surimi that provides a certain degree of rigidity to the stick. In addition, each stick is wrapped in a plastic film, which provides the ability both to prevent dirt from being deposited on the surface of the stick, and to handle the surimi stick without it sticking to the handling tools.

The handling of filled food products manufactured by means of the method disclosed in FR 2912603 is therefore fairly easy.

However, the fact that the filled food is packaged in a plastic film renders the appearance of the product unappealing to the customer. In addition, having to wrap each filled food unit in a clean plastic film consumes a large amount of plastic, and is thus not environmentally friendly. It is therefore desirable to avoid the use of the plastic film.

In addition, the applicant has identified a consumer demand for filled food products of the type wrapped in a roll of ham, comprising of a filling of cheese and a thin exterior enveloping sleeve of ham. However, such filled foods are far less rigid than the filled surimi sticks, and in particular are very easily deformable, which makes unsuitable the devices used for tray packing as known from the prior art.

It is therefore an objective of the invention to provide a gripping device that is capable of picking up at a high industrial rate a deformable food without deforming it, and is able to deposit it in a packaging tray or similar container. Other objectives include in particular ensuring that the gripping device is designed so as to be capable of picking up a sticky product without the latter remaining stuck to the gripping device, that it is easy to clean, has a long operational life, and that it enables the deformable product to be picked up and deposited in place rapidly.

To this end, the object of the invention relates to a gripping device for gripping at least one deformable food product, advantageously a filled food item comprising of an exterior enveloping sleeve surrounding an interior filling, the device comprising:
  a chamber,
  a chamber-depressurisation system for depressurising the chamber,
  a fluid connection connecting the depressurisation system to the chamber, and
  at least one perforated plate defining a receiving surface for receiving the deformable food product, the perforated plate having at least one perforation opening into the receiving surface and into the chamber.

According to particular embodiments of the invention, the gripping device also has one or more of the following characteristic features, taken into consideration alone or in accordance with any technically possible combination(s):
  the perforated plate has a plurality of perforations;
  the receiving surface is concave;
  the or each perforation has a diameter that is less than 2 mm, preferably between 1.5 mm and 2 mm;
  it includes a valve for selectively closing or opening the fluid connection between the depressurisation system and the chamber, the said valve being a flap gate valve;
  the fluid connection between the depressurisation system and the chamber comprises of a single pipe;
  the or each perforated plate is made of high density polyethylene;
  it includes a gas blowing system in the chamber;
  it includes a stripper plate defining a bearing surface for bearing against the deformable food product, the said bearing surface framing the receiving surface, the stripper plate being movable in translational motion relative to the perforated plate between a retracted position, in which the bearing surface is withdrawn towards the chamber in relation to the receiving surface, and a deployed position, in which the receiving surface is withdrawn towards the chamber in relation to the bearing surface;
  the stripper plate is made of a high density polyethylene.

The object of the invention also relates to an assembly comprising of a deformable food product and a gripping device as defined here above for picking up the said deformable food product.

In particular embodiments of the invention, the assembly also presents one or more of the following characteristic features, taken into consideration alone or in accordance with any technically possible combination(s):
  the deformable food product comprises a gripping surface constituted of more than 25% of the exterior surface of the deformable food product, the or each perforated plate being formed in a manner such that the receiving surface has a form shaped to be complementary to that of the said gripping surface.
  the deformable food product comprises two bases defining the axial ends of the deformable food product, and a peripheral lateral surface connecting the two bases to each other, the gripping surface being constituted of a portion of the lateral surface.
  the deformable food product comprises and advantageously consists of an enveloping sleeve constituted of a first food material, such as a slice of ham or the like, including a slice of fish, for example salmon, surrounding an interior filling constituted of a second food material, preferably cheese products, such as fresh cottage cheese, a cheese specialty product of such type as fresh cottage cheese or fresh processed cheese, processed cheese, or any similar food material known to the person skilled in the art.

The object of the invention also relates to a production installation for producing deformable food product units each comprising of an exterior enveloping sleeve constituted of a first food material and an interior filling constituted of a second food material, the installation comprising:
  a supply station for providing a sheet of the first food material;
  a supply system for providing a roll of the second food material;
  a wrapping station for wrapping the sheet around the roll;
  a cutting station for cutting the roll and the sheet wrapped around it into a plurality of portions each forming a deformable food product unit; and
  a packaging station for packaging the deformable food product units, comprising a gripping device as defined here above for picking up the deformable food product units and depositing the said deformable food product units into containers.

The object of the invention also relates to a product displacement method for displacing a deformable food product by means of a gripping device as described here above, comprising of the following successive steps:

bringing the receiving surface in contact with the deformable food product;
depressurisation of the chamber;
moving of the gripping device; and
stopping of the depressurisation of the chamber.

According to particular embodiments of the invention, the product displacement method also presents one or more of the following characteristic features, taken into consideration alone or in accordance with any technically possible combination(s):

it includes an additional step of blowing of gas into the chamber, following the step of stopping the chamber depressurisation;
it includes an additional step, following the step of stopping the chamber depressurisation, of displacement of a stripper plate of the gripping device, in a manner such
that the stripper plate pushes the deformable food product unit away from the receiving surface;
the step of displacement of the stripper plate is repeated at least twice in less than two seconds.

Other characteristic features and advantages of the invention will become apparent upon reading the description which will follow, given solely by way of example and with reference being made to the accompanying drawings, in which.

Figures 1, 4:
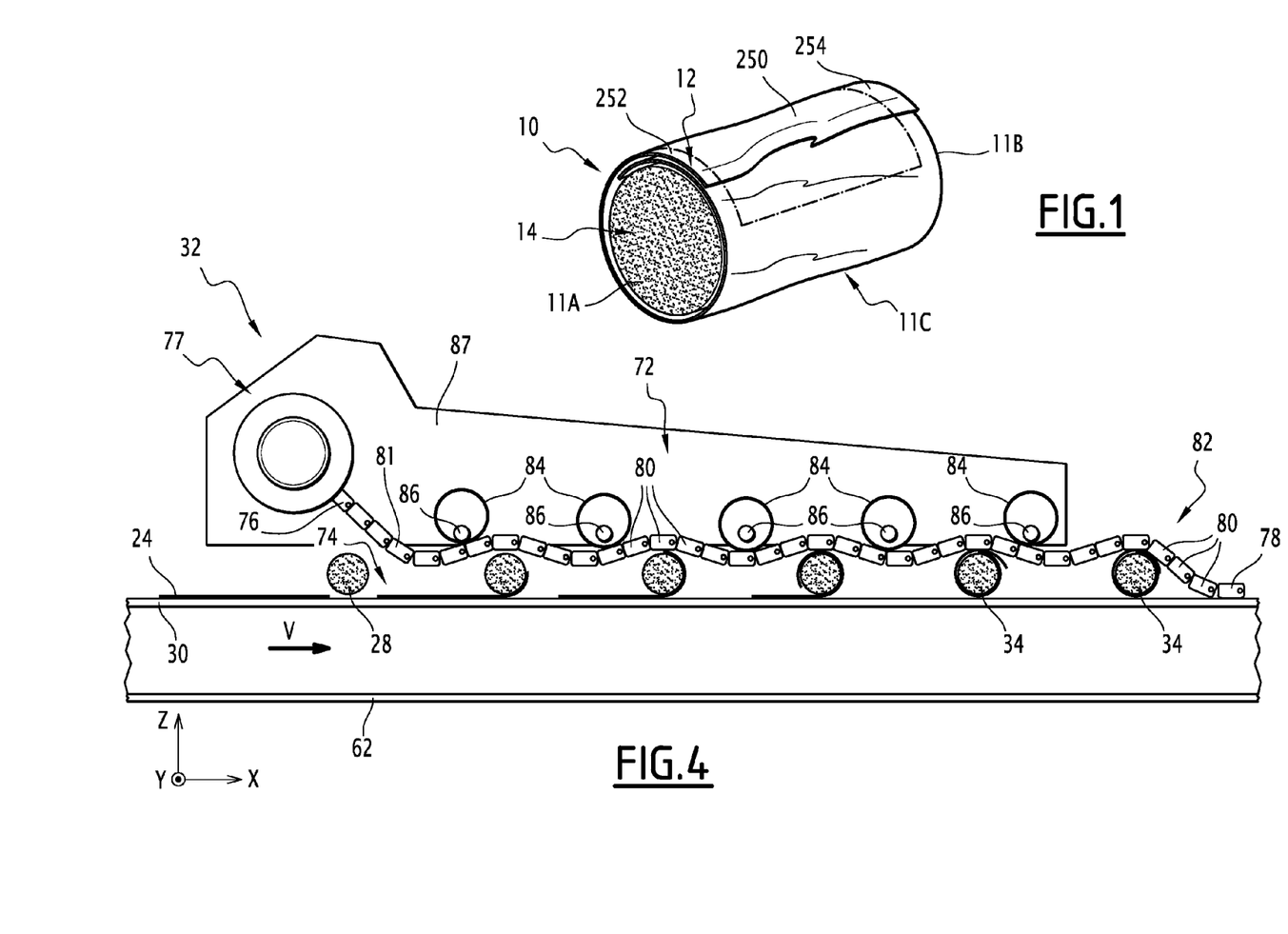
FIG. 1 is a perspective view of the deformable food product in an assembly according to the invention.
FIG. 4 is a view from the side of a wrapping station of the installation shown in FIG. 2.

With reference to FIG. 1, the gripping device according to the invention is designed for picking up deformable products such as the filled food unit 10.

This filled food unit 10 has a substantially circular cylindrical form. It thus presents two bases 11A, 11B each defining an axial end of the filled food unit 10, and a peripheral lateral surface 11C connects the bases 11A, 11B to each other. It typically has a diameter measuring between 1 cm and 3 cm, and a length measuring between 2 cm and 8 cm.

The filled food unit 10 comprises of an exterior enveloping sleeve 12 constituted of a first food material, and an interior filling 14 constituted of a second food product.

The exterior enveloping sleeve 12 is tubular. It defines the peripheral lateral surface 11C of the filled food unit 10. It does not cover the axial ends of the filled food unit 10.

Viewed from one axial end of the filled food unit 10, it forms a spiral around the interior filling 14.

The first food product is typically meat, and preferably ham.

The interior filling 14 forms a solid cylinder. It is flush with the axial ends of the filled food unit 10.

The second food product is typically a cheese product comprising of cheese, preferably more than 70% by weight of cheese. This cheese product is in particular constituted of a fatty curd mixed with spices.

The second food product in particular has a density of between 0.9 and 1.

Preferably, the second food product has a penetrometer value of between 80 and 300. It is advantageously a shear thinning product having a consistency of between 800 and 1200 Pa·s at 12° C., with a shear thinning index comprised between 0.10 and 0.20.

Figure 2:
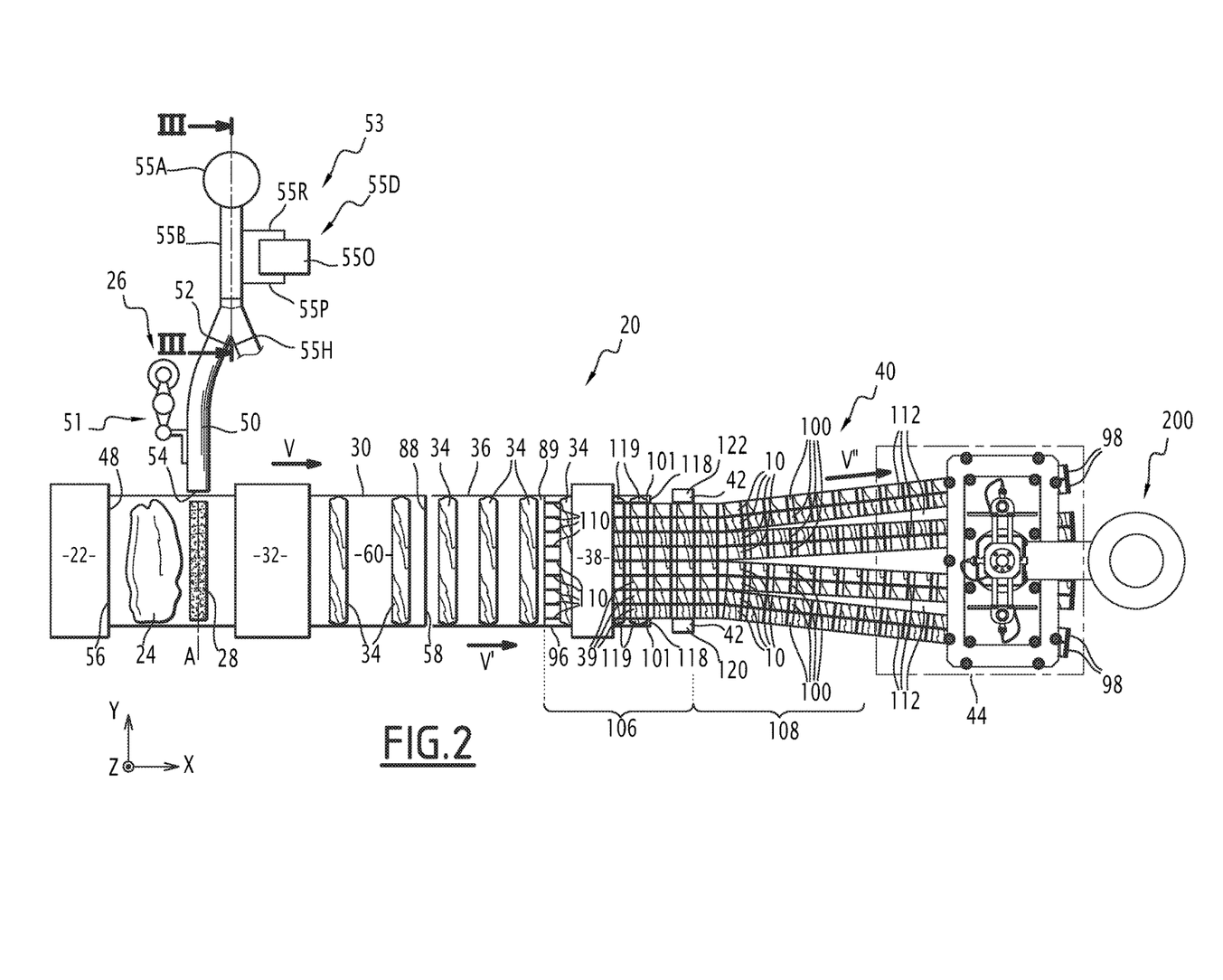
FIG. 2 is a general overall view, from above, of an installation according to the invention.

The gripping device according to the invention is in particular part of the installation 20 shown in FIG. 2.

As seen in this figure, the installation 20 comprises a supply station 22 for providing a sheet 24 of the first food product, a supply system 26 for providing a roll 28 of the second food product, and a drive belt 30 for driving the sheet 24 and the roll 28. The installation 20 also includes a wrapping station 32 for wrapping the sheet 24 around the roll 28 to form a large roll 34, and a storage conveyor belt 36 for storing of large rolls 34. The installation 20 finally includes a cutting station 38 for cutting each large roll 34 into portions 39, a drive mechanism 40 for driving and separation of the portions 39, a removal system 42 for removing the end portions 39, and a packaging station 44 for packing the filled food units 10.

In the remainder of this description, the directional orientation terms are to be understood in relation to the direct orthogonal reference coordinate defined here below, represented in the figures, and in which the following are distinguished:

a longitudinal axis X, oriented from upstream to downstream,
a transverse axis Y, oriented from the right to the left, and
a vertical axis Z, oriented from the bottom to the top.

The supply station 22 is disposed at the upstream end of the system 20. It is typically made up of a robotic ham slicer. This robotic slicer is adapted for receiving a block of ham and for automatically dispensing it in slices. Such robots are well known and commonly used in the agri food industry.

The supply station 22 includes a deposit outlet 48 for depositing the sheet 24 of the first food product.

The sheet 24 is substantially rectangular. The outlet 48 is capable of depositing the sheet 24 on to the drive belt 30 in a manner such that the direction of greatest dimension of the sheet 24 is oriented substantially transversely.

The roll 28 is substantially rectilinear and extends along an axis A.

The supply system 26 is capable of depositing the roll 28 on to the drive belt 30 in a manner such that the axis A is oriented substantially transversely. To this end, the supply system 26 comprises a flexible hose 50 for depositing the second food product on to the belt drive 30, and an articulated handling arm 51 for manoeuvering the flexible hose 50.

The flexible hose 50 comprises a distal end 52 for supplying the flexible hose 50 with the second food product. This distal end is connected to a dosing device 53 for dosing the second food product. The flexible hose 50 also includes an outlet proximal end 54 for outputting the second food product out of the flexible hose 50.

The articulated arm 51 is programmed so as to move the proximal end 54 transversely. On an optional basis, it is also programmed so as to move the proximal end 54 longitudinally and vertically.

Figure 3:
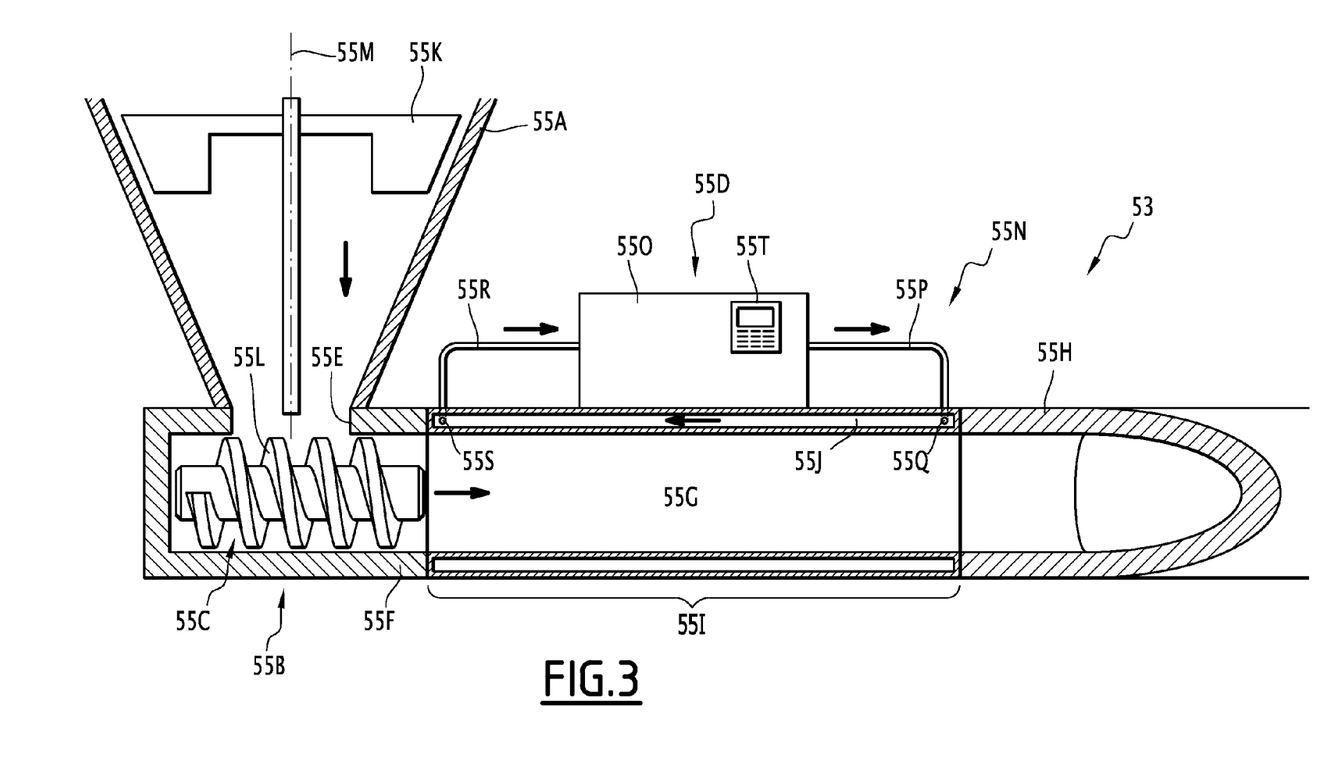
FIG. 3 is a cross sectional view of a dosing device of the installation shown in FIG. 2, marked as III in FIG. 2.

The dosing device 53 comprises, with reference to FIG. 3, a receiving hopper 55A for receiving the second food product, a conveying tube 55B for conveying the second food product from the hopper 55A to the flexible hose 50, and a drive system 55C for driving the second food product into the tube 55B. The dosing device 53 also comprises a cooling system 55D for cooling the second food product in the tube 55B.

The hopper 55A is disposed above the tube 55B. It has in its bottom an opening 55E which opens into the tube 55B.

The tube 55B extends from the hopper 55A to the flexible hose 50. It includes an exterior wall 55F defining an interior space 55G for circulation of the second food product. The wall 55F is in particular made of stainless steel.

The tube 55B also includes a hollow walled section 55I. In this section 55I, the wall 55F is hollow and defines a peripheral chamber 55J, extending around the interior space 55G, for circulation of a coolant fluid for cooling the second food product.

A connector 55H, disposed at a connecting end for connecting the tube 55B to the flexible hose 50, brings about the fluid communication of the tube 55B with the flexible hose 50. In the example shown, this connector 55H is a Y connector, so as to also place the tube 55B in fluid communication with another flexible hose (not shown) of a second supply system (not shown) for supplying the second food product.

The drive system 55C includes an agitator arm 55K and an endless screw 55L.

The agitator arm 55K is disposed in the hopper 55A. It is mounted so as to be movable in rotation in relation to the hopper around an axis of rotation 55M coinciding with the axis of the hopper 55A. It is adapted so as to, during its rotation, exert a force on the second food product present in the hopper 55A thereby pushing the second food product toward the opening 55E.

The endless screw 55L is disposed in the tube 55B. Its axis of rotation coincides with the axis of the tube 55B. The endless screw 55L extends in particular below the opening 55E.

The cooling system 55D comprises of a circuit 55N for circulation of a coolant fluid, and a cooling unit 55O for cooling of the coolant fluid.

The coolant fluid is typically brine. The circuit 55N is adapted so as to guide this coolant fluid from the cooling unit 55O to the chamber 55J, in a manner such that the coolant fluid flows in a counter current direction relative to the flow of the second food product in the chamber 55J. To this end, the circuit 55N comprises:
- a first flexible hose 55P bringing about fluid connection of the cooling unit 55O with one end 55Q of the chamber 55J close to the connector 55H,
- a second flexible hose 55R bringing about fluid connection of the cooling unit 55O with one end 55S of the chamber 55J opposite the connector 55H, and
- a pump (not shown), for causing the flowing of the coolant fluid in the chamber 55J from the end 55Q to the end 55S.

The cooling unit 55O is capable of extracting the heat from the cooling circuit 55N in a manner so as to bring the coolant fluid to a set point temperature comprised between −8° C. and +4° C. Preferably, it includes, as shown, a control module 55T that is adapted so as to enable an operator to change the set point temperature.

Given that the drive system 55C has a tendency to heat the second food product and to thus degrade it, the cooling system 55D provides the ability to mitigate this heating and to thereby restore the qualities of the second food product, in particular in terms of viscosity. This provides the ability to obtain a roll 28 having a satisfactory mechanical strength.

In addition, the possibility provided to the operator to change the set point temperature makes it possible to adjust the cooling the second food product in the tube 55B in accordance with the mechanical properties of the second food product received in the hopper 55A. It is thus possible to precisely control the mechanical strength of the roll 28, regardless of the mechanical properties of the batch of the second food product used for producing the roll 28.

Referring back to FIG. 2, the drive belt 30 extends from an upstream end 56 for the handling of the first and second food products up to a downstream end 58 for depositing of the large rolls 34 on to the storage conveyor belt 36.

In a known manner, the drive belt 30 is an endless conveyor belt tensioned by cylinders (not shown) disposed at the upstream and downstream ends 56, 58 of the belt 30. A part of the belt 30, disposed above the cylinders, defines a top surface 60 of the belt 30. Another part of the belt 30 disposed below the cylinders, defines a bottom surface 62 (FIG. 3) of the belt 30.

One of these cylinders is driven by a motor (not shown), in a manner such as to drive the belt 30 so that each point of the top surface 60 moves from the upstream end 56 to the downstream end 58. A speed V of the drive belt 30 is defined as being the speed of each of these points. The speed V is thus directionally oriented so as to be substantially longitudinal, going from upstream to downstream.

The velocity V is in particular comprised between 100 and 200 mm/s.

The drive belt 30 passes through the wrapping station 32.

With reference to FIG. 4, the wrapping station 32 includes, in the example represented, a first belt 70 and a second belt 72 defining between them an insertion space 74 for introducing the sheet 24 and the roll 28.

The first belt 70 consists of the drive belt 30.

The second belt 72 is flexible and suspended above the drive belt 30. It includes an upstream end 76 attached to a fastening bracket 77 at a distance above the drive belt 30, and a downstream end 78 which rests on the drive belt 30.

The distance from the fastening bracket 77 to the drive belt 30 is in particular greater than the diameter of the roll 28.

The insertion space 74 is delimited between the upstream end 76 of the second belt 72, and the top surface 60 of the drive belt 30.

The second belt 72 is a mesh belt. It is formed of a plurality of meshes 80 arranged consecutively to each other, going from upstream to downstream. Each mesh 80 is connected in an articulated fashion to the or each mesh 80 that is adjacent thereto about an axis that is substantially transverse. Each mesh 80 is elongated in a transverse direction. Each mesh 80 is in particular constituted by means of a plastic profile.

The meshes 80 include a contact initiating mesh 81 for bringing about contact with the roll 28. This mesh 81 is the mesh that is closest to the upstream end 76 it being capable of bringing about contact with the roll 28. This mesh 81 is in particular the mesh that is closest to the upstream end 76 it being disposed at a distance from the driving belt 30 that is substantially equal to the diameter of the roll 28.

The contact initiating mesh 81 is preferably oriented to be substantially parallel to the top surface 60 of the drive belt 30.

The wrapping station 32 also includes a suspension device 82 for suspending the second belt 72 above the drive belt 30. This device 82 comprises the fastening bracket 77, and a plurality of tubes 84, each freely mounted over a bar 86 having a diameter that is smaller than the interior diameter of the tube 84. The term "freely mounted over a bar 86", is used to indicate that the tube 84 is disposed around the bar 86, the axis of the tube 84 being substantially parallel to the direction of greatest dimension of the bar 86, there is no device opposing the movement of the tube 84 relative to the bar 86 in a plane that is perpendicular to the said direction of greatest dimension.

Preferably, each tube 84 has a length that is less than that of the corresponding bar, and the suspension device 82 also includes an end stop (not shown) at each end of each bar 86, constituted for example of a flange for holding the corresponding tube 84 around the bar 86.

Each bar 86 is disposed at a distance from the belt 30 that is equal to the sum of the diameter of the large roll 34, the thickness of the belt 72, and the thickness of the tube 84 mounted over the said bar 86. The bars 86 thus make it possible to maintain the belt 72 pressed down against the large roll 34 when it is inserted between the belts 30, 72, in a manner so as to ensure proper pressing of the sheet 24 on the roll 28.

Each tube 84 is advantageously, as shown, substantially cylindrical.

The tubes 84 are regularly and uniformly distributed between the upstream end 76 and downstream end 78 of the second belt 72.

It was observed in a surprising manner that these tubes 84 provide the ability to improve the quality of the wrapping of the sheet 24 around the roll 28.

Preferably, the bars 86 and the fastening bracket 77 are integrally attached to the same frame 87 of the suspension device 82, the said frame 87 having a height that is adjustable relative to the drive belt 30. It is thus possible to adjust the position of the second belt 72 based on the size desired for the filled foods.

Referring back to FIG. 2, the storage conveyor belt 36 is an endless conveyor belt tensioned by cylinders (not shown) disposed at an upstream end 88 and at a downstream end 89 of the belt 36. The upstream end 88 is contiguous to the downstream end 58 of the belt 30. It is preferably arranged to be lower than the said downstream end 58 of the belt 30.

A part of the belt 36, disposed above the cylinders, defines a top surface of the belt 36. Another part of the belt 36, disposed below the cylinders, defines a bottom surface (not shown) of the belt 36.

One of these cylinders is driven by a motor (not shown), in a manner such as to drive the belt 36 so that each point of the top surface moves from the upstream end 88 to the downstream end 89. All of the points of the top surface thus move at the same speed V' which is defined as being the speed of the storage conveyor belt 36, and which is directionally oriented so as to be substantially longitudinal, going from upstream to downstream. The speed V' is lower than the speed V.

The cutting station 38 is disposed downstream of the storage conveyor belt 36.

The cutting station 38 is a station for cutting by means of a water jet. This ensures the ability to cut the large roll 34 without coming into contact with the latter, which serves to prevent the food product from being deposited on a knife and is therefore hygienic. In addition, it makes it possible to have a compact cutting station 38.

Figure 5:
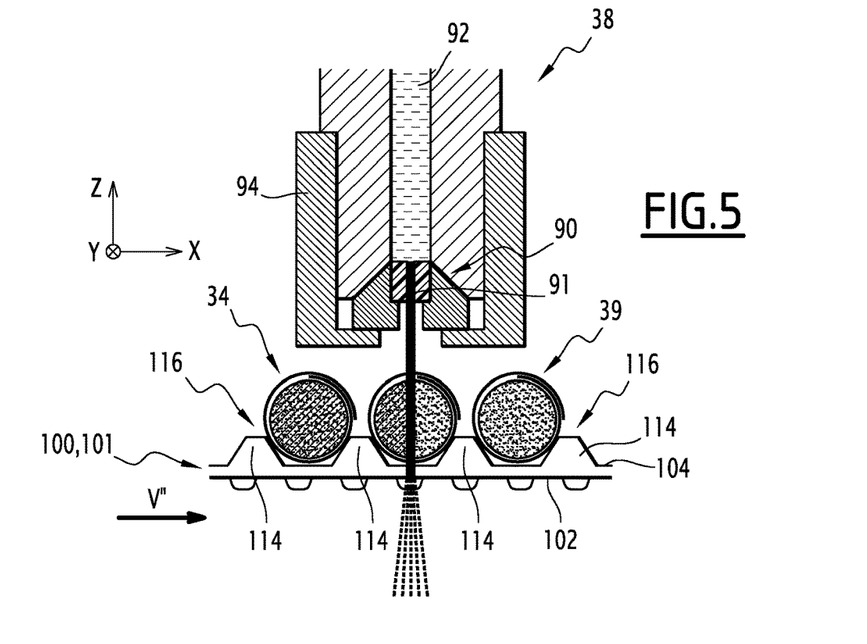
FIG. 5 is a cross sectional view of a cutting station of the installation shown in FIG. 2.

In particular, as is visible in FIG. 5, the cutting station 38 includes a plurality of nozzles 90 (only one of them is represented in FIG. 5) for ejection of water at high pressure, preferably at higher than 2000 bars, typically at 2200 bars. Thus, the cut made is clean and does not damage the portions 39.

Each nozzle 90 defines an orifice 91 for ejection of water. This orifice 91 has a diameter that is preferably greater than 0.14 mm, typically equal to 0.15 mm. Thus, the jet of water is sufficiently large so as to drive with it a part of the second food product, which prevents the portions 39 from getting stuck to each other again after the cutting.

Each nozzle 90 is supplied with water by means of a conduit 92. A valve (not shown), preferably a solenoid valve, controls the supply of water to the conduit 92 for supplying water to each nozzle 90.

In the example shown, the nozzles 90 are accommodated in a housing 94, preferably made out of stainless steel. Thus, the cleaning of the cutting station 38 is facilitated.

Referring back to FIG. 2, the device 40 extends from an upstream end 96, abutting the downstream end 89 of the storage conveyor belt 36, to a downstream end 98.

The device 40 comprises a plurality of drive belts 100, 101. The number of the said drive belts 100, 101 is equal to the number of nozzles 90, plus one.

Each drive belt 100, 101 is an endless belt tensioned by rollers (not shown) disposed at the ends of the belt 100, 101. One of the said ends delimits the first end 96.

Each belt 100, 101 includes an inner surface 102 (FIG. 5), oriented towards the rollers, and an outer surface 104 (FIG. 5), opposite to the inner surface 102.

A part of the outer surface 104, disposed above a straight line connecting the rollers associated to the belt 100, 101, defines a top surface of the belt 100, 101. Another part of the outer surface 104, disposed below the said straight line, defines a bottom surface (not shown) of the belt 100, 101.

For each belt 100, 101, one of the rollers associated with the said belt 100, 101 is driven by a motor (not shown), in a manner so as to drive the belt 100, 101 in order for each point of the top surface to move from the upstream end 96 to the downstream end 98. All of the points of the top surface thus move at the same given speed V" which is defined as being the speed of the belt 100, 101.

The speed V" is equal for each belt 100, 101. It is also equal to the speed V'.

Each belt 100, 101 has a width, measured in the transverse direction Y, that is smaller than the width of each of the belts 30, 36. This width is the same for all the belts 100, 101.

The belts 100, 101 include central belts 100, and two end belts 101.

The end belts 101 are disposed at the transverse ends of the device 40. A first end belt 101 is disposed at the right transverse end and a second end belt 101 is disposed at the left transverse end.

The central belts 100 are disposed transversely between the end belts 101. Together, the end belts 101 transversely frame the central belts 100.

The portions 39 carried by the ends of belts 101 constitute the product offcut remnants 119. The portions 39 carried by the central belts 100 constitute the filled food product units 10 produced by the installation 20.

Each central belt 100 extends from the upstream end 96 of the device 40 to the downstream end 98. Each end belt 101 is shorter than each central belt 100.

Over a first portion 106 of the device 40, the belts 100, 101 extend parallel to each other. Over a second portion 108 of the device 40, the belts 100 diverge relative to each other.

Each end belt 101 extends exclusively in the first portion 106. Thus, each end belt 101 does not have any portions that move away from the other belts 100, 101.

In the first portion 106, each belt 100, 101 extends substantially longitudinally. The belts 100, 101 are juxtaposed with each other along the transverse direction Y. Between each pair of consecutive belts 100, 101, a space 110 of constant width, that is to say, the width of which does not vary between the upstream and downstream sections of the first portion 106, is provided between the said belts 100, 101. This width is preferably less than one fifth of the width of each belt 100, 101.

The widths of the belts 100, 101 and the spaces 110 are adjusted in order for their sum to be substantially equal to the width of the storage conveyor belt 36.

In the first portion 106, the belts 100, 101 pass through the cutting station 38. They are arranged in relation to the nozzles 90 in a manner such that each nozzle 90 is disposed above a space 110.

Each end belt 101 extends from the upstream end 96 up to a terminal end 118. The said terminal end 118 is disposed downstream of the cutting station 38 and upstream of the removal system 42.

In the second portion, the belts 100 are juxtaposed with each other along the transverse direction Y. Each belt 100 extends along a direction of extension forming an angle with the direction of extension of each other belt 100. For each pair of consecutive belts 100 the angle formed between the directions of extension of the said belts 100 is preferably less than 0°7'. In particular, for each exterior pair of consecutive belts 100, that is to say for each pair of consecutive belts 100 such that one of the belts 100 of the pair is not framed transversely by two other belts 100, the angle formed between the direction of extensions of the belts 100 of the pair is preferably less than 0°55'.

It is to be noted that, for reasons of clarity, the angles between the directions of extension of the belts 100 have been accentuated on FIG. 2.

For each pair of consecutive belts 100, a space 112 is provided between the said belts 100. This space 112 has a width which increases going from upstream to downstream. It constitutes the extension of a space 110. Thus, at the boundary between the first and second parts 106, 108, the width of the space 112 is equal to the width of the corresponding space 110.

The filled foods 10 thus being carried away from each other, there is no likely risk of them sticking to each other again. In addition, with this operation being done without the handling of the filled food units 10, the latter are not damaged.

With reference to FIG. 5, each belt 100, 101 is indented. In other words, the exterior surface 104 of each belt 100, 101 includes a plurality of ribs 114, each oriented perpendicularly to the direction of extension of the belt 100, 101, and defining between them the recessed cells 116 for receiving the large rolls 34.

The recessed cells 116 of the various different belts 100, 101 are aligned transversely relative to each other.

This indentation makes it possible to hold the large rolls 34 longitudinally away from each other, in a manner so as to prevent them from sticking to each other.

Referring back to FIG. 2, the removal system 42 is disposed transversely on either side of the central belts 100, upstream of the second portion 108 of the device 40. It is capable of detaching from the filled food units 10 carried by the central belts 100 the offcut remnants 119 stuck to the said filled food units 10.

For this purpose, the removal system 42 includes two compressed air knives 120, 122. A first compressed air knife 120 is arranged to the right of the central belts 100, and is flush with the central belt 100 disposed farthest to the right. A second compressed air knife 122 is arranged to the left of the central belts 100, and is flush with the central belt 100 disposed farthest to the left. The use of compressed air knives 120, 122 provides the ability to remove the offcut remnants 119 without the removal system 42 being in contact with the food products, which prevents the fouling of the removal system 42 and as a consequence thereof simplifies the cleaning of the installation 20.

Figure 6:
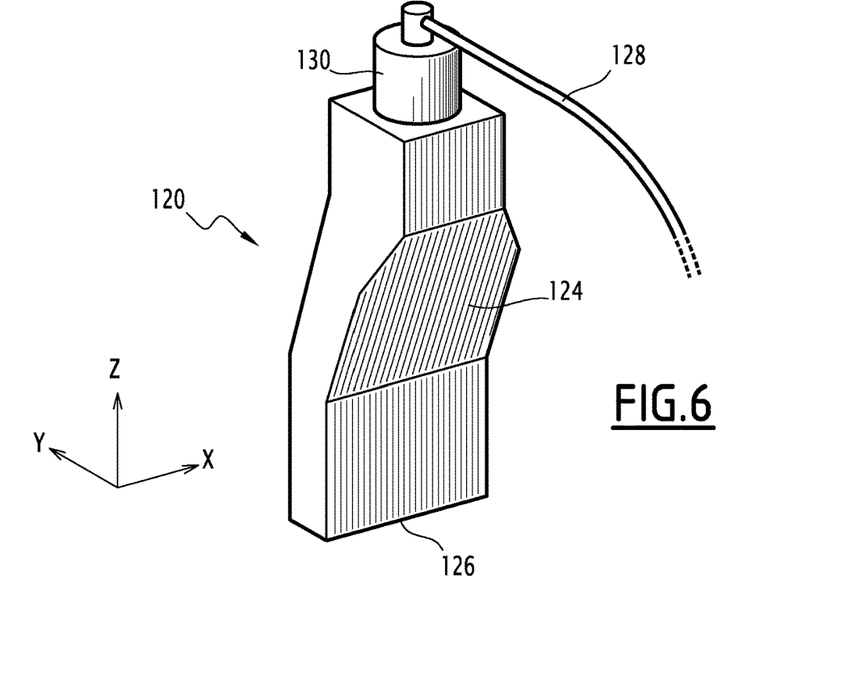
FIG. 6 is a perspective view of a compressed air knife of the installation shown in FIG. 2.

With reference to FIG. 6, in which only the first compressed air knife 120 is represented, each compressed air knife 120, 122 includes a body 124 comprising of an internal chamber (not shown) for receiving compressed air, and opening towards the exterior of the body 124 through an oblong orifice 126 oriented downwards. It also includes a pipe 128 for supplying the chamber with compressed air, and a solenoid valve 130, interposed between the pipe 128 and the chamber, in order to control the supply of air to the chamber. The solenoid valve 130 is programmed so as to bring about fluid connection of the chamber to the pipe 128 at regular time intervals.

The compressed air knife, respectively 120, 122 is arranged in a manner such that the oblong orifice 126 is elongated parallel to the direction of extension of the central belts 100, and is flush with the central belt 100 disposed respectively farthest to the right, and farthest to the left.

The packaging station 44 is disposed at the downstream end of the installation 20. It includes a gripping device 200 according to the invention for gripping the filled food units 10 on the central belts 100, and for depositing the said food units in the trays (not shown).

Figure 7:
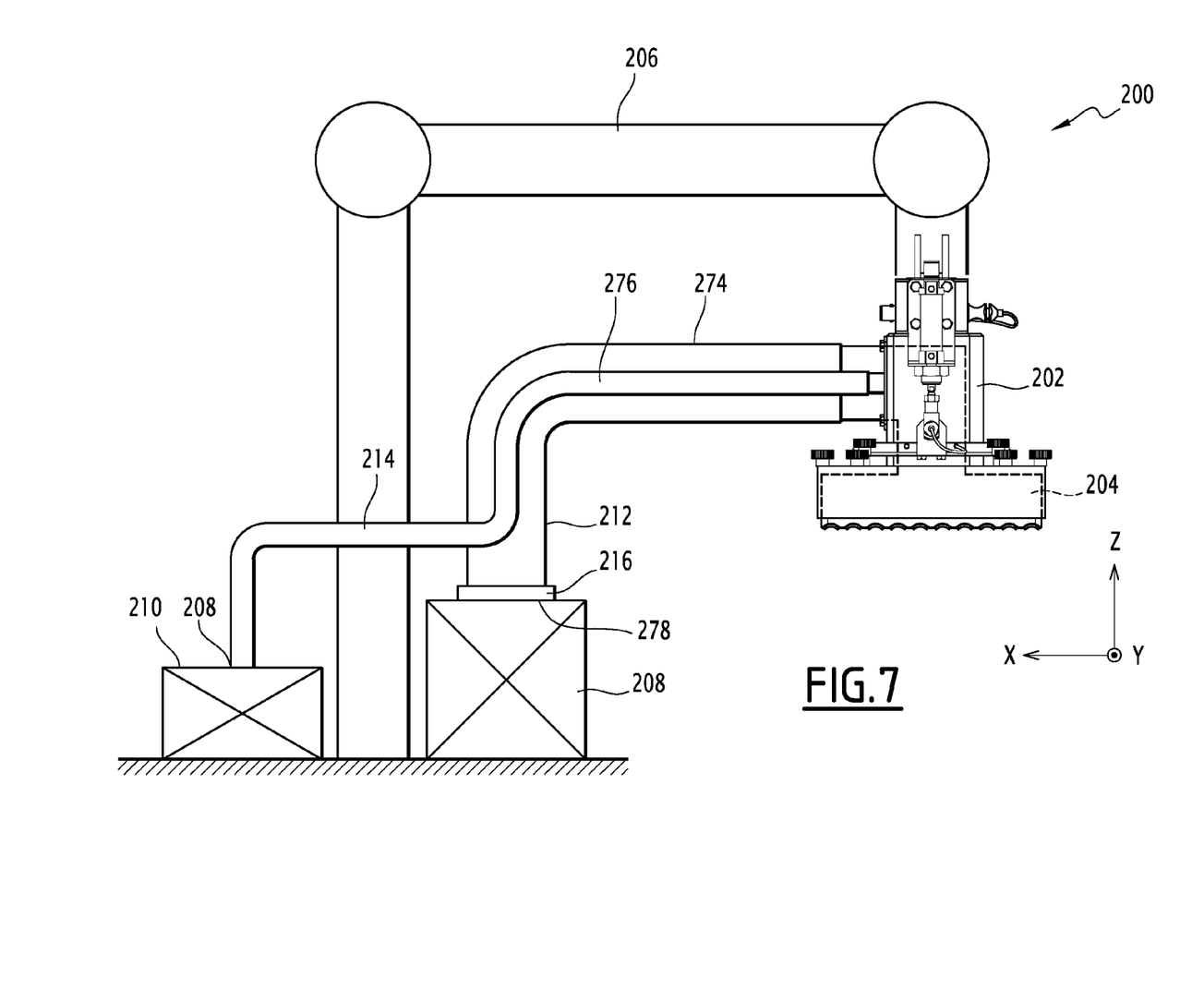
FIG. 7 is a view in elevation of a gripping device of the installation shown in FIG. 2.

With reference to FIG. 7, the gripping device 200 includes a gripping head 202, delimiting an internal chamber 204, and a robotic arm 206 for the moving of the gripping head 202. It also includes a depressurisation system 208 for depressurisation of the chamber 204, a gas blowing system 210 for blowing gas in the chamber 204, a first fluid connection 212 connecting the depressurisation system 208 to the chamber 204, and a second fluid connection 214 connecting the blowing system 210 to the chamber 204. Finally, the device 200 includes a valve 216, for selectively closing or opening the first fluid connection 212.

Figure 8:
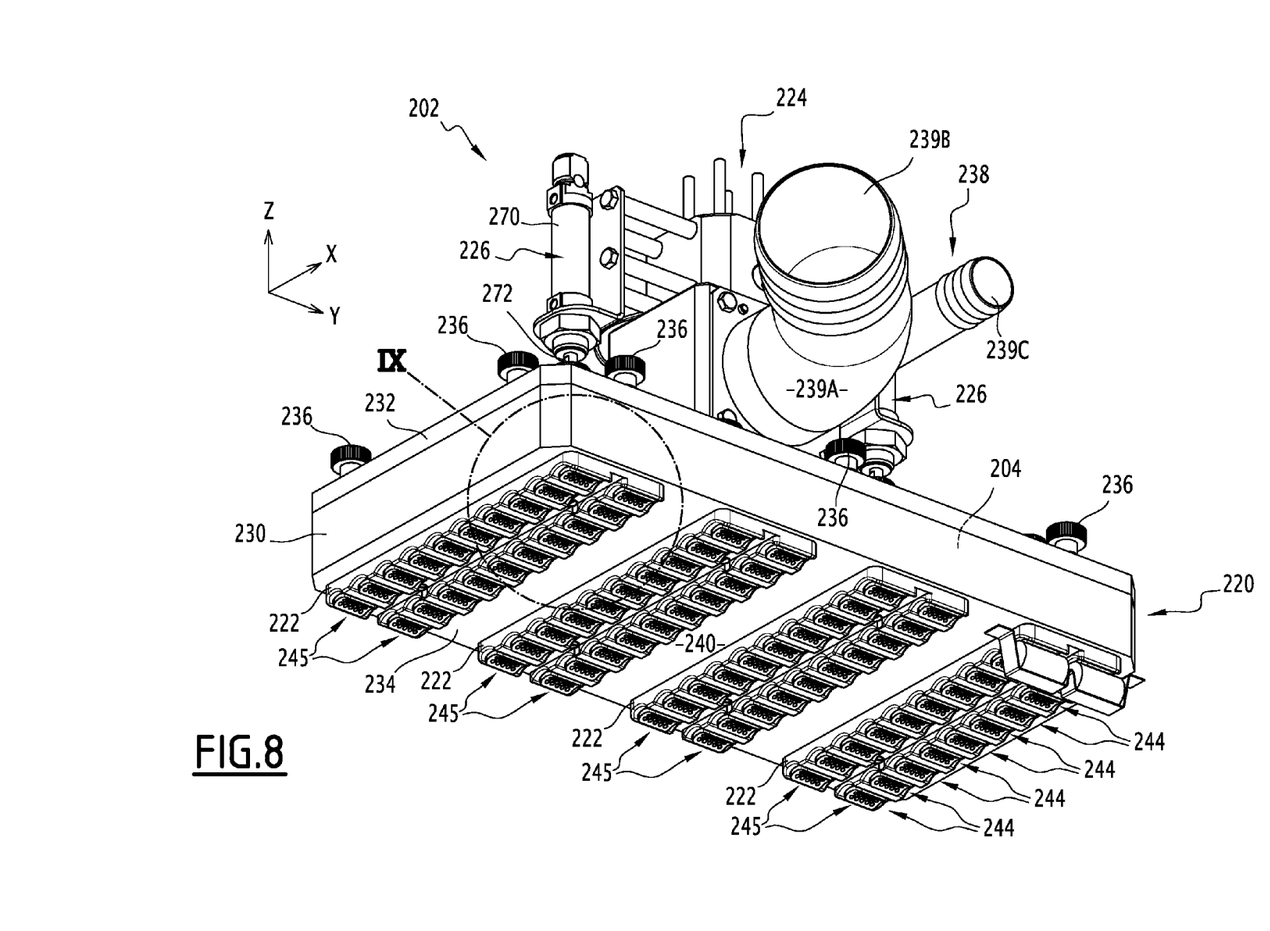
FIG. 8 is a perspective view, from below, of a gripping head of the gripping device shown in FIG. 7.

With reference to FIG. 8, the gripping head 202 includes a body 220 that delimits the chamber 204, and a plurality of stripper plates 222, each mounted so as to be movable in translational motion over the body 220. The gripping head 202 also includes a connection member 224 for connecting the body to the robotic arm 206, and actuators 226, in order to move the stripper plates 222 relative to the body 220.

The body 220 includes a frame 230, a cover 232 and a bottom 234, between which is delimited the chamber 204.

The frame 230, the cover 232 and the bottom 234 are advantageously each made out of high density polyethylene (HDPE). Through the use of this material, a long operational life of the body 220 is guaranteed because HDPE is very highly resistant to cool environments, typically having a temperature below 8° C., and to aggressive cleaning agents used in the agri food industry. In addition, HDPE is lightweight, in particular lighter than stainless steel, which makes it possible to use for the robotic arm 206 a relatively low powered robotic arm, which is therefore less expensive and energy efficient.

The frame 230 and bottom 234 are integrally formed. The frame 230 and the cover 232 are assembled in a manner so as to be detachable from one another, so as to allow for the cleaning of the chamber 204. To this end, the cover 232 has a plurality of through holes (not shown), distributed around its periphery and disposed to be facing the respective threaded orifices (not shown) formed in the frame 230, and the screws 236, each engaged through one of the said through holes and screwed in the respective threaded orifice.

The frame 230 has a substantially parallelepiped shaped form.

The cover 232 has a shape that is complementary to that of the frame 230. It bears the connecting member 224.

The cover 232 also bears a connector 238 for the first and second fluid connections 212, 214. The connector 238 has a generally Y shaped form, with the stem 239A of the Y fluidly connected to the chamber 204, a first branch 239B of the Y fluidly connected to the first fluid connection 212, and a second branch 239C of the Y fluidly connected to the second fluid connection 214. The first branch 239B has a diameter that is greater than that of the second branch 239C.

The bottom 234 has a substantially planar exterior surface 240, from which protrude a plurality of protuberances 242 (FIG. 9) out of the bottom 234. Each protuberance 242 protrudes out towards the exterior, in the direction away from the chamber 204.

The protuberances 242 are aligned in rows 244 that are substantially parallel to each other and in columns 245 that are substantially parallel to each other. The columns 245 are oriented to be substantially perpendicular to the rows 244. The number of columns 245 is equal to the number of central belts 100 that are included in the drive mechanism 40.

The term "substantially parallel", is understood to indicate that the angle formed between the two rows 244 or two consecutive columns 245 is less than 0°7'.

Figure 9:
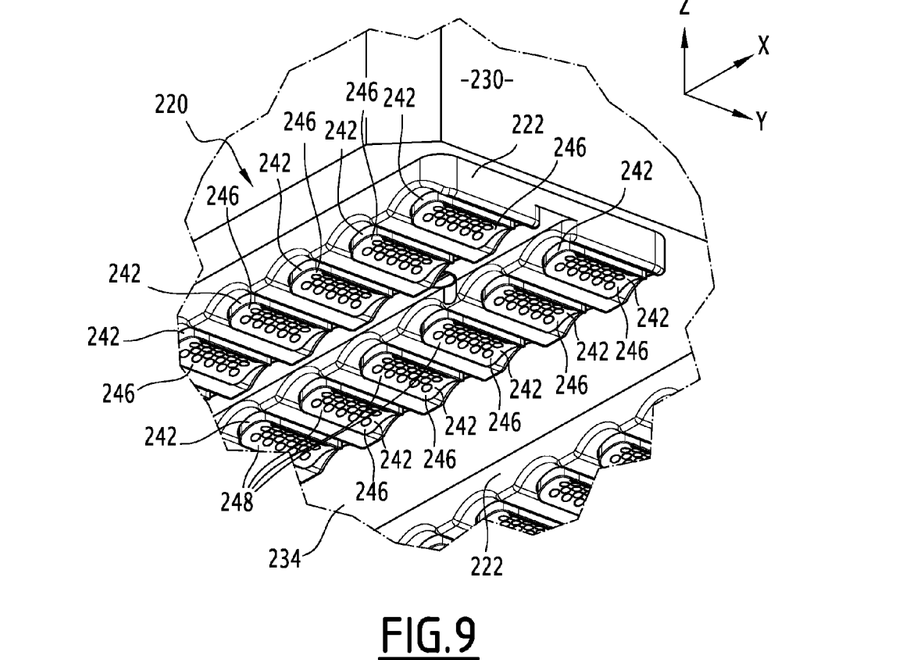
FIG. 9 is a view of a detail of the gripping head, marked as IX in FIG. 8.

With reference to FIG. 9, each protuberance 242 is hollow. It delimits an internal cavity (not shown) opening into the chamber 204. It is closed at its end opposite to the exterior surface 240 by a perforated plate 246.

In the remainder of this description, the internal cavity of each protuberance 242 will be likened to a part of the chamber 204.

The perforated plate 246 of each protuberance 242 defines an exterior receiving surface 248 for receiving one of the filled food units 10. This receiving surface 248 is designed to come into contact with a gripping surface 250 (FIG. 1) of the said filled food unit 10.

The gripping surface 250 is constituted of more than 25% of the exterior surface of the filled food unit 10. It is in particular formed by a part of the lateral surface 11C.

The gripping surface 250 does not extend from one of the axial ends of the filled food unit 10 to the other. In other words, the end sections 252, 254 (FIG. 1) of the filled food unit 10 are left free on both sides of the gripping surface 250.

The receiving surface 248 is concave, with a concavity oriented towards the direction away from the chamber 204. In particular, the receiving surface 248 has a form shaped to be complementary to that of the gripping surface 250. Thus, in the example represented, the receiving surface 248 has a form shaped like a portion of a cylinder. An axial direction of the receiving surface 248 is defined in reference to the cylinder of which the receiving surface 248 would thus form a portion.

Figure 10:
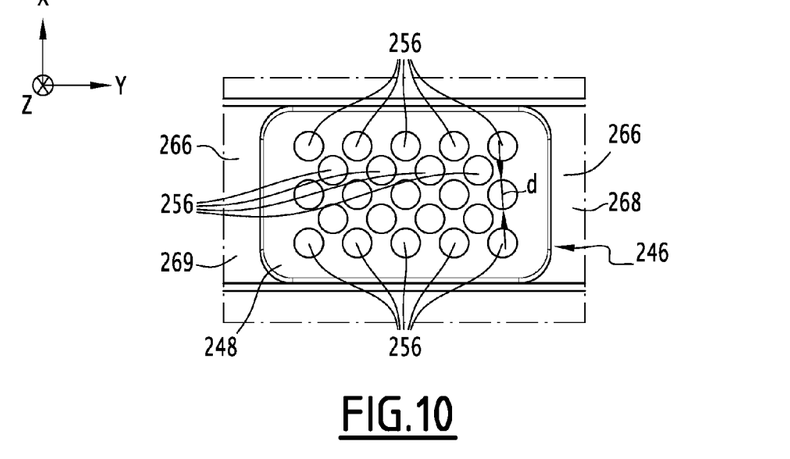
FIG. 10 is a view from the bottom of a detail of the gripping head shown in FIG. 8.

With reference to FIG. 10, the perforated plate 246 has a plurality of perforations 256 each opening into the gripping surface 248 and into the chamber 204. Each perforation 256 has a diameter d that is less than 2 mm, and preferably comprised between 1.5 and 2 mm.

Figure 11:
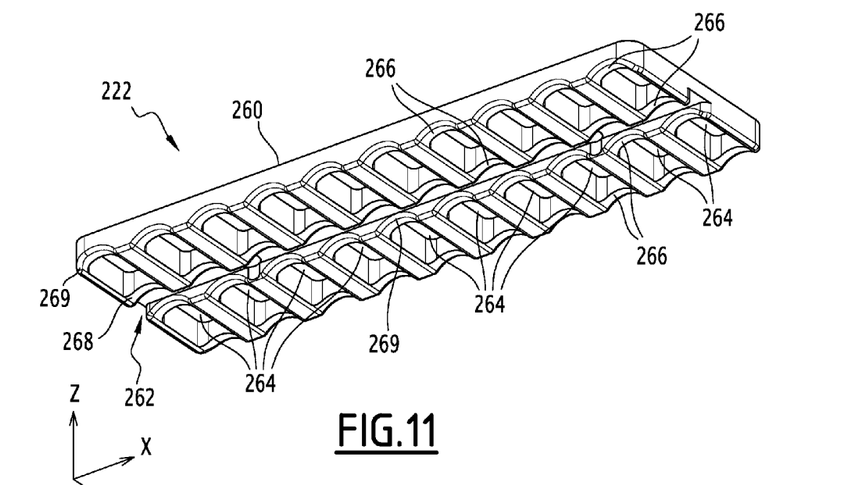
FIG. 11 is a perspective view, from below, of a stripper plate of the gripping head shown in FIG. 8.

With reference to FIG. 11, each stripper plate 222 is formed as a single one piece unit made of HDPE. It has a top surface 260, designed to come into contact with the exterior surface 240 of the bottom 234, a bottom surface 262, opposite the top surface 260, and a plurality of windows 264 passing there through, each opening in the top surface 260 and in the bottom surface 262.

Each window 264 is associated with a respective protuberance 242. The respective protuberance 242 extends through the window 264, in a manner such that the stripper plate 222 surrounds the said protuberance 242. The window 264 has a contour that is complementary to the exterior contour of the perforated plate 246 closing the respective protuberance 242.

Each stripper plate 222 is adapted for surrounding the protuberances 242 of two adjacent columns 245.

Each stripper plate 222 has a plurality of bearing surfaces 266, each framing a respective window 264. In particular, each stripper plate 222 has a bearing surface 266 for each window 264, of the stripper plate.

Each bearing surface 266 thus also frames a respective receiving surface 248, which is the receiving surface 248 defined by the perforated plate 246 closing the protuberance 242 associated with the respective window 264.

Each stripper plate 222 is mounted to be mobile in translational motion relative to the body 220 between a retracted position, in which each bearing surface 266 of the stripper plate 222 is withdrawn towards the chamber 204 in relation to the receiving surface 248, and a deployed position, in which, for each bearing surface 266, the respective receiving surface 248 is withdrawn towards the chamber 204 in relation to the said bearing surface 266.

The bearing surface 266 is designed to come into abutment against the end sections 252, 254 of a filled food unit 10 in contact with the respective receiving surface 248, when the stripper plate 222 is in the deployed position.

For this purpose, the bearing surface 266 comprises two portions 268, 269 disposed on either side of the receiving surface 248. Each of the said portions 268, 269 is concave. Each of the said portions 268, 269 is disposed at one axial end of the receiving surface 248. A first 268 of the said portions 268, 269 is thus adapted to come into abutment against a first 252 of the end sections 252, 254 of the filled food unit 10, and the second portion 269 is adapted to come into abutment against the second end portion 254 of the filled food unit 10.

In the example shown, the bearing surface 266 is constituted of the said portions 268, 269.

Referring back to FIG. 8, in the example shown, each actuator 226 is constituted of a hydraulic cylinder. It comprises of a cylinder 270 that is integrally secured to the connecting member 224, and a piston 272 that is integrally secured to each stripper plate 222.

The robotic arm 206 is programmed so as to move the gripping head 202 between a gripping position for gripping the filled food units 10, in which the gripping head 202 is arranged above the central belts 100, close to the said central belts 100, and a position for depositing the filled food unit 10, in which the gripping head 202 is moved away from the central belts 100, above a conveyor belt for trays (not shown).

In the gripping position, each row 244 is oriented substantially transversely and each column 245 is oriented substantially longitudinally.

Referring back to FIG. 7, the depressurisation system 208 is typically constituted of a vacuum pump, for example a venturi air pump, or a side channel vacuum pump.

The gas blowing system 210 typically includes an air compressor.

Each of the first and second fluid connections, respectively 212, 214, comprises a single pipe, respectively 274, 276, connected at one end to an outlet 278 of the depressurisation system 208, and respectively to an outlet 280 of the blowing system 210, and connected by the opposite end to the connector 238 of the head 202. Thus, the robotic arm 206 can move the head 202 without risk of the first and second fluid connections 212, 214 becoming entangled with each other.

The valve 216 is, for example, as represented, disposed in the proximity of the connection end for connecting the pipe from the first fluid connection 212 to the depressurisation system 208.

Figure 12:
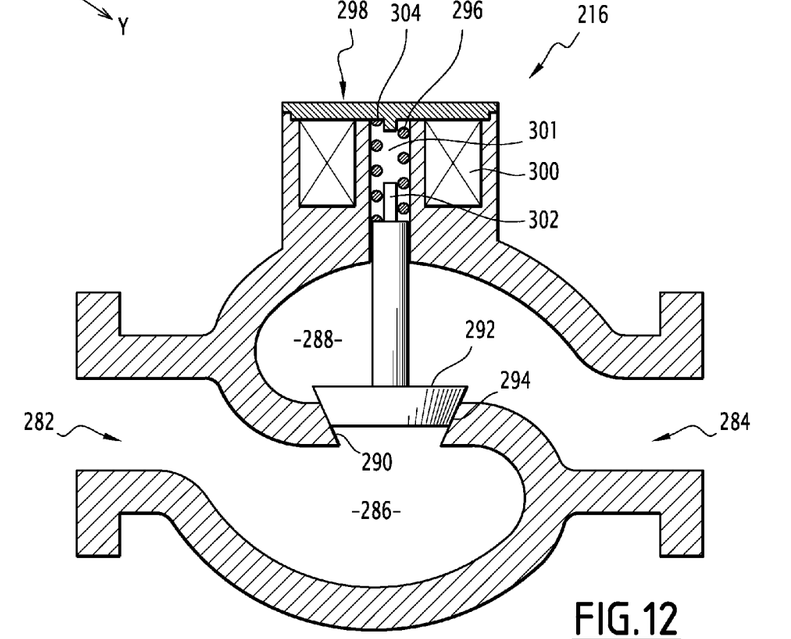
FIG. 12 is a cross sectional view of a valve of the gripping device shown in FIG. 7.

With reference to FIG. 12, the valve 216 is, as represented, a flap gate valve. The valve 216 thus comprises, in a known manner, an inlet 282, an outlet 284, an upstream chamber 286 fluidly connected to the inlet 282, a downstream chamber 288 fluidly connected to the outlet 284, an orifice 290 for effecting fluid connection of the upstream chamber 286 to the downstream chamber 288, and a flap gate valve 292 for closing the orifice 290.

The flap gate valve 292 is movable between a closed position for closing off the orifice 290, in which it comes to bear against a valve seat 294 surrounding the orifice 290, as shown in FIG. 12, and an open position (not shown) for opening the orifice 290, in which the flap gate valve 292 is moved away from the valve seat 294.

The valve 216 also includes the return means 296 for returning flap gate valve 292 to its closed position, and an electromagnetic actuator 298, for moving the flap gate valve 292 to its open position.

The electromagnetic actuator 298 typically comprises, as shown, a coaxial solenoid 300, and a movable core 302 made of soft iron, mounted so as to be able to slide in a cavity 301 relative to the solenoid 300. The cavity 301 is oriented along the axis of the solenoid 300. The soft iron core 302 is integrally secured to the flap gate valve 292.

The electromagnetic actuator 298 is adapted so that, when a current flows in the solenoid 300, the movable core 302 moves towards a bottom 304 of the cavity 301.

In the example shown, the return means 296 are constituted of a compression spring interposed between the movable core 302 on the one hand, and the bottom 304 of the cavity 301 on the other hand.

A method for manufacturing filled food products by means of the installation 20 will be described next, with reference to FIGS. 2 to 12 which illustrate the highly advantageous embodiments of the invention.

In an initial step, a block of ham (not shown) is introduced into the supply station 22. It is cut into slices therein, each slice forming a sheet of food product 24. Each sheet 24 is deposited on the top surface 60 of the drive belt 30, and is driven by the latter in the downstream direction.

In a subsequent step, the endless screw 55L rotates a predetermined number of turns around its axis. In doing so, it pushes the second food product present in the tube 55B to the flexible hose 50.

The dosing device 53 injects a predetermined quantity of the second food product into the flexible hose 50. Under the effect of pressure caused by this injection of the second food product, the second food product present in the flexible hose 50 exits through the proximal end 54. Simultaneously, the arm 51 moves the proximal end 54 of the flexible hose 50 from the right to the left, downstream of a sheet of the first food product 24. Thus, the second food product is deposited on to the belt drive 30 in the form of a roll 28 disposed downstream of the said sheet 24.

Carried by the belt 30, the roll 28 and the sheet 24 enter into the wrapping station 32. There, they are introduced between the drive belt 30 and the second belt 72.

First of all, a top surface of the roll 28 comes into contact with the second belt 72. The second belt 72 retains this top surface, while the bottom surface of contact of the roll 28 with the belt 30 continues to be driven downstream. Under the effect of these opposing forces, the roll 28 starts to roll on the drive belt 30 and over the second conveyor belt 72. While rolling over the driving belt 30, the roll 28 comes into contact with the sheet 24, and rolls on to the sheet 24. The sheet 24 adheres to the roll 28 and, under the effect of the rotation of the roll 28 about its axis, gets wrapped around the roll 28.

When the sheet 24 is completely wrapped around the roll 28, the two together form a large roll 34. The large roll 34 continues to roll about itself under the combined effect of the drive belt 30 and the second belt 72, until it reaches the downstream end 78 of the second belt 72. Thus, the cohesion of the large roll 34 is enhanced.

When the large roll 34 passes under a tube 84, the tube is lifted and rolls over the belt 72. This rolling motion of the tube 84 conveniently enables the sheet 24 to be pressed and flattened on to the roll 28. Thus, the appearance of the large roll 34 is further improved.

The large roll 34 is then driven right to the downstream end 58 of the belt 30, from where it drops on to the storage conveyor belt 36. It is then driven by the storage conveyor belt 36 up to its downstream end 89, where it drops into the recessed cells 116 of the belts 100, 101.

The large roll 34 is driven by the belts 100, 101 through the cutting post 38, where it is cut into portions 39 by means of the water jet cutting process. Each portion 39 is then carried by a belt 100, 101 respectively. The portions 39 corresponding to the transverse ends of the large roll 34 constitute the offcut remnants 119 and are carried by the end belts 101. The other portions 39 constitute the filled food units 10 and are carried by the central belts 100.

Each offcut remnant 119, carried by an end belt 101, drops to the level of the terminal end 118 of the said belt 101. In the case where the said offcut remnant 119, instead of dropping, remains adhered to the adjacent filled food unit 10, the offcut remnant 119 is detached by making use of one of the air knives 120, 122. To this end, when the offcut remnant 119 is below the compressed air knife 120, 122, the solenoid valve 130 opens in order to fluidly connect the pipe 128 to the chamber of the body 124. Compressed air enters into the said chamber and exits therefrom, under pressure, through the oblong orifice 126. This compressed air pushes the offcut remnant 119 towards the bottom, which then detaches from the filled food unit 10 and drops.

The filled food units 10 then continue to be driven downstream by the belts 100. With the belts 100 diverging from each other, the filled food units 10 are progressively moved away from each other. They finally arrive at the packaging station 44, where they are picked up off the belts 100 by the gripping device 200.

In particular, the robotic arm 206 brings the head 202 into the gripping position, so that the receiving surface 248 defined by the perforated plate 246 closing each protuberance 242 of the bottom 234 is in contact with a filled food unit 10. Here, a current is injected into the solenoid 300 of the electromagnetic actuator 298 of the valve 216 and the flap gate valve 292 is moved into the orifice opening position 290. The depressurisation system 208 then draws out the air present in the chamber 204.

The perforations 256 of each perforated plate 246 being plugged by a filled food unit 10, air cannot enter into the chamber 204 to compensate for the air drawn out by the depressurisation system 208. This therefore creates a relative vacuum in the chamber 204 and, as under the effect of this vacuum, the filled food units 10 are pressed against the receiving surfaces 248. On account of the shape of the receiving surfaces 248 and the small diameter of the perforations 256, the filled food units 10 are not deformed.

The robotic arm 206 then moves the head into the product depositing position 202. Throughout the entire duration of the movement, the solenoid 300 continues to be fed with electric current, and the depressurisation system 208 is kept running.

Once the head 202 is in the depositing position, the solenoid 300 ceases to be supplied with current electric. Under the effect of the return means 296, the flap gate valve 292 moves abruptly into the position for closed the orifice 290, which thereby enables instantly stopping the depressurisation of the chamber 204, which returns rapidly to a state of pressure equilibrium with the exterior.

The filled food units 10 are no longer pressed against the receiving surfaces 248, and are able to drop into the trays arranged below the head 202.

However, the filled food units 10 being sticky, they tend to remain stuck to the receiving surfaces 248. In order to facilitate the detachment thereof, air is thus blown into the chamber 204 by means of the blowing system 210. As a result of the blown air, the pressure increases in the chamber 204, and pressurised air is expelled through the perforations 256. This pressurised air presses against the filled food units 10 and thus contributes to their being loosened and detached from their respective receiving surfaces 248.

In order to assist in the detachment, each stripper plate 222 is, at the same time, moved from its retracted position to its deployed position. Thus, each bearing surface 266 bears against the end sections 252, 254 of a filled food unit 10, and pushes it away from the receiving surface 248.

This operation of movement of each stripper plate 222 from its retracted position to its extended position is repeated three times in less than two seconds, each stripper plate 222 being repositioned in the meantime in its retracted position. It was observed that the repetition of the moving operation provided for a more effective detachment of the filled food units 10, while ensuring that the filled food units 10 were deformed to a lesser extent.

The blowing system 210 is then stopped, and the head 202 is brought into the gripping position for picking up the filled food units 10.

Thanks to the invention, it is possible to pick up a deformable product without deforming it. In addition, the invention makes it possible to prevent the deformable product from remaining stuck to the gripping device. In addition, the cleaning of the gripping device is facilitated, which allows for its use in environments having to comply with stringent hygiene standards, such as food product manufacturing facilities. Finally, the invention provides the ability to ensure rapid handling and manoeuvering of deformable products, and is therefore entirely suited for use in an industrial plant with high production rates.

Moreover, thanks to the invention, it is possible to produce at a high rate, the filled food units presenting a satisfactory appearance, even when those filled food units are constituted of soft and/or sticky food products. In addition, the invention enables the production of these filled foods in excellent hygiene conditions, which is an important point with respect to the food safety of the marketed products, in particular owing to the fact that the cleaning of the production plant has been facilitated.

The invention claimed is:

1. A gripping device for gripping at least one deformable food product, wherein the gripping device comprises:
   a gripping head comprising a chamber and at least one perforated plate,
   the at least one perforated plate defining a continuous receiving surface designed to come into contact with a gripping surface of the deformable food product and having a form shaped to be complementary to that of the gripping surface, the perforated plate having a plurality of perforations, each perforation opening into the receiving surface and into the chamber, the continuous receiving surface being comprised of material hygienically safe for coming into contact with the gripping surface of the deformable food product in a non-contaminating manner, the material of the continuous receiving surface being hygienically safe for each of meat, fish, and cheese,
   a chamber-depressurization system for depressurizing the chamber,
   a fluid connection connecting the chamber-depressurization system to the chamber, and
   a displacement device for displacing the gripping head while the deformable food product is being gripped by the continuous receiving surface of the at least one perforated plate,
   wherein the gripping head includes a stripper plate defining a bearing surface for bearing against the deformable food product, said bearing surface framing the receiving surface, the stripper plate being movable in translational motion relative to the perforated plate between a retracted position, in which the bearing surface is withdrawn towards the chamber in relation to the receiving surface, and a deployed position, in which the receiving surface is withdrawn towards the chamber in relation to the bearing surface.

2. The gripping device according to claim 1, wherein the receiving surface is concave.

3. The gripping device according to claim 1, wherein the or each perforation has a diameter that is less than 2 mm.

4. The gripping device according to claim 1, including a valve for selectively closing or opening the fluid connection between the depressurization system and the chamber, said valve being a flap gate valve.

5. The gripping device according to claim 1, wherein the fluid connection between the depressurization system and the chamber comprises of a single pipe.

6. The gripping device according to claim 1, wherein the or each perforated plate is made of high density polyethylene.

7. The gripping device according to claim 1, including a gas blowing system for blowing gas into the chamber.

8. The gripping device according to claim 1, wherein the stripper plate is made of a high density polyethylene.

9. An assembly comprising:
a deformable food product, wherein the deformable food product comprises a gripping surface constituted of more than 25% of the exterior surface of the deformable food product; and
a gripping device for picking up said deformable food product, wherein said gripping device comprises:
a gripping head comprising a chamber and at least one perforated plate,
the at least one perforated plate defining a continuous receiving surface that comes into contact with the gripping surface of the deformable food product, the at least one perforated plate having a plurality of perforations, each perforation opening into the receiving surface and into the chamber, the receiving surface having a shape complementary to that of said gripping surface, the continuous receiving surface being comprised of material hygienically safe for coming into contact with the gripping surface of the deformable food product in a non-contaminating manner, the material of the continuous receiving surface being hygienically safe for each of meat, fish, and cheese,
a chamber-depressurization system for depressurizing the chamber,
a fluid connection connecting the chamber-depressurization system to the chamber, and
a displacement device for displacing the gripping head while the deformable food product is being gripped by the continuous receiving surface of the at least one perforated plate,
wherein the gripping head includes a stripper plate defining a bearing surface for bearing against the deformable food product, said bearing surface framing the receiving surface, the stripper plate being movable in translational motion relative to the perforated plate between a retracted position, in which the bearing surface is withdrawn towards the chamber in relation to the receiving surface, and a deployed position, in which the receiving surface is withdrawn towards the chamber in relation to the bearing surface.

10. The assembly according to claim 9, wherein the deformable food product comprises two bases defining the axial ends of the deformable food product, and a peripheral lateral surface connecting the two bases to one another, the gripping surface being constituted of a portion of the lateral surface.

11. A production installation for producing deformable food product units each deformable food product unit comprising an exterior enveloping sleeve constituted of a first food material and an interior filling constituted of a second food material, the installation comprising:
a supply station for providing a sheet of the first food material;
a supply system for providing a roll of the second food material;
a wrapping station for wrapping the sheet around the roll;
a cutting station for cutting the roll and the sheet wrapped around the roll into a plurality of portions each forming a deformable food product unit, wherein the deformable food product comprises a gripping surface on an exterior surface of the deformable food product; and
a packaging station for packaging the deformable food product units, comprising a gripping device for picking up the deformable food product units and depositing said deformable food product units into containers,
wherein said gripping device comprises:
a gripping head comprising a chamber and at least one perforated plate,
the at least one perforated plate defining a continuous receiving surface that comes into contact with the gripping surface of the deformable food product and having a form shaped to be complementary to that of the gripping surface, the perforated plate having a plurality of perforations, each perforation opening into the receiving surface and into the chamber, the continuous receiving surface being comprised of material hygienically safe for coming into contact with the gripping surface of the deformable food product unit in a non-contaminating manner, the material of the continuous receiving surface being hygienically safe for each of meat, fish, and cheese,
a chamber-depressurization system for depressurizing the chamber,
a fluid connection connecting the chamber-depressurization system to the chamber, and
a displacement device for displacing the gripping head while the deformable food product unit is being gripped by the continuous receiving surface of the at least one perforated plate,
wherein the gripping head includes a stripper plate defining a bearing surface for bearing against the deformable food product, said bearing surface framing the receiving surface, the stripper plate being movable in translational motion relative to the perforated plate between a retracted position, in which the bearing surface is withdrawn towards the chamber in relation to the receiving surface, and a deployed position, in which the receiving surface is withdrawn towards the chamber in relation to the bearing surface.

12. A product displacement method for displacing a deformable food product by means of a gripping device, the method comprising the following successive steps:
providing the gripping device, said gripping device comprising:
a gripping head comprising a chamber and at least one perforated plate,
the at least one perforated plate defining a continuous receiving surface for receiving the deformable food product and having a form shaped to be complementary to that of a gripping surface of the deformable food product, the perforated plate having a plurality of perforations, each perforation opening into the receiving surface and into the chamber, the receiving surface having a shape complementary to that of said gripping surface, the continuous receiving surface being comprised of material hygienically safe for coming into contact with the gripping surface of the deformable food product in a non-contaminating manner,
a chamber-depressurization system for depressurizing the chamber,
a fluid connection connecting the chamber-depressurization system to the chamber, and
a displacement device for displacing the gripping head while the deformable food product is being gripped by the continuous receiving surface of the at least one perforated plate,
wherein the gripping head includes a stripper plate defining a bearing surface for bearing against the deformable food product, said bearing surface framing the receiving surface, the stripper plate being movable in translational motion relative to the perforated plate between a retracted position, in which the bearing surface is withdrawn towards the chamber in relation to the receiving surface, and a deployed position, in which the receiving surface is withdrawn towards the chamber in relation to the bearing surface;

bringing the receiving surface in contact with the gripping surface of the deformable food product to have while the deformable food product be gripped by the continuous receiving surface of the at least one perforated plate;

depressurization of the chamber;

displacement of the receiving surface while the deformable food product is being gripped by the continuous receiving surface of the at least one perforated plate; and stopping of the depressurization of the chamber;

wherein the product displacement method includes an additional step, following the step of stopping the chamber depressurization, of displacement of the stripper plate, in a manner such that the stripper plate pushes the deformable food product unit away from the receiving surface.

13. The product displacement method according to claim 12, including an additional step of blowing gas into the chamber, following the step of stopping the chamber depressurization.

14. The product displacement method according to claim 12, wherein the step of displacement of the stripper plate is repeated at least twice in less than two seconds.

* * * * *